United States Patent
Kii et al.

(10) Patent No.: US 10,334,131 B2
(45) Date of Patent: Jun. 25, 2019

(54) IMAGE READING APPARATUS AND PROCESSING DEVICE WITH SPECIFIC ASSEMBLY FOR COVER OPEN/CLOSE DETERMINATION

(71) Applicant: SEIKO EPSON CORPORATION, Tokyo (JP)

(72) Inventors: Soichiro Kii, Shiojiri (JP); Etsuo Tsuji, Matsumoto (JP); Osamu Hanamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 8 days.

(21) Appl. No.: 15/868,268

(22) Filed: Jan. 11, 2018

(65) Prior Publication Data

US 2018/0213099 A1 Jul. 26, 2018

(30) Foreign Application Priority Data

Jan. 24, 2017 (JP) .................................. 2017-010447

(51) Int. Cl.
*H04N 1/00* (2006.01)

(52) U.S. Cl.
CPC ..... *H04N 1/00708* (2013.01); *H04N 1/00551* (2013.01); *H04N 1/00559* (2013.01); *H04N 2201/0081* (2013.01)

(58) Field of Classification Search
CPC combination set(s) only.
See application file for complete search history.

(56) References Cited

U.S. PATENT DOCUMENTS

| 8,213,060 B2 * | 7/2012 | Fujibayashi | ....... H04N 1/00551 358/474 |
| 2015/0103385 A1 | 4/2015 | Ohara | |
| 2018/0034986 A1 * | 2/2018 | Ishida | ................ H04N 1/00527 |

FOREIGN PATENT DOCUMENTS

| JP | 2001-255120 A | 9/2001 |
| JP | 2010-199806 A | 9/2010 |
| JP | 2015-075645 A | 4/2015 |
| JP | 2015-079039 A | 4/2015 |
| JP | 2016-119571 A | 6/2016 |

* cited by examiner

*Primary Examiner* — Barbara D Reinier
(74) *Attorney, Agent, or Firm* — Workman Nydegger

(57) ABSTRACT

An image reading apparatus includes a document placement surface, a document cover that rotates between a closed state and an open state, a pressing portion that is disposed on the side of the document table and presses a switch, a rotary lever that is disposed on the side of the document cover and applies external force to the pressing portion, and a biasing member that biases one end side of the rotary lever in a direction that moves away from the document cover, in which when the document cover is at a predetermined angle, one end of the rotary lever pushes down the pressing portion to change the state of the switch, and in the process of displacement from the predetermined angle to the closed state, the one end of the rotary lever rotates in a direction approaching the document cover and maintains the state of the switch.

6 Claims, 15 Drawing Sheets

FIG. 13

|  | SENSOR (CLOSED STATE DETECTION) | SWITCH (HALF-OPEN STATE DETECTION) | DOCUMENT COVER OPEN AND CLOSED STATE |
|---|---|---|---|
| STATE 1 | L | L | CLOSED STATE |
| STATE 2 | H | L | HALF-OPEN STATE |
| STATE 3 | L | H | NONE |
| STATE 4 | H | H | OPEN STATE |

FIG. 14

| STATE | FAULT SYMBOL |
|---|---|
| FAULT IN STATE OF OUTPUT SIGNAL L | Err-L |
| FAULT IN STATE OF OUTPUT SIGNAL H | Err-H |
| NORMAL | Normal |

FIG. 15

| SENSOR (CLOSED STATE DETECTION) | SWITCH (HALF-OPEN STATE DETECTION) | EQUIVALENT |
|---|---|---|
| Normal | Normal | BOTH ARE NORMAL, NORMALLY OPERATE. |
| Normal | Err−L | SINCE OPEN STATE (STATE 4) IS NOT RECOGNIZED, PROCESS DOES NOT PROCEED TO DOCUMENT SIZE DETECTION PROCESS SEQUENCE. |
| Normal | Err−H | OPEN STATE (STATE 4) IS RECOGNIZED. AFTER OPEN STATE RECOGNITION, HALF-OPEN STATE (STATE 2) IS NOT RECOGNIZED. |
| Err−L | Normal | SINCE OPEN STATE (STATE 4) IS NOT RECOGNIZED, PROCESS DOES NOT PROCEED TO DOCUMENT SIZE DETECTION PROCESS SEQUENCE. |
| Err−L | Err−L | SINCE OPEN STATE (STATE 4) IS NOT RECOGNIZED, PROCESS DOES NOT PROCEED TO DOCUMENT SIZE DETECTION PROCESS SEQUENCE. |
| Err−L | Err−H | SINCE OPEN STATE (STATE 4) IS NOT RECOGNIZED, PROCESS DOES NOT PROCEED TO DOCUMENT SIZE DETECTION PROCESS SEQUENCE. |
| Err−H | Normal | AFTER RECOGNIZING OPEN STATE (STATE 4), HALF-OPEN STATE (STATE 2) IS ALSO RECOGNIZED, BUT OPEN STATE (STATE 1) IS NOT RECOGNIZED. |
| Err−H | Err−L | SINCE OPEN STATE (STATE 4) IS NOT RECOGNIZED, PROCESS DOES NOT PROCEED TO DOCUMENT SIZE DETECTION PROCESS SEQUENCE. |
| Err−H | Err−H | SINCE THE OPEN STATE (STATE 4) IS MAINTAINED, PROCESS DOES NOT PROCEED TO DOCUMENT SIZE DETECTION PROCESS SEQUENCE. |

FIG. 20

| SENSOR NO. | ① | ② | ③ | ④ | ⑤ | ⑥ | ⑦ |
|---|---|---|---|---|---|---|---|
| A6V | ○ | × | × | × | × | × | × |
| A6H | ○ | × | × | × | × | × | × |
| B6V | ○ | × | × | × | × | × | × |
| B6H | ○ | ○ | × | × | × | × | × |
| A5V | ○ | × | × | × | × | ○ | × |
| A5H | ○ | ○ | ○ | × | × | × | × |
| B5V | ○ | ○ | × | × | × | ○ | × |
| B5H | ○ | ○ | ○ | ○ | × | × | × |
| A4V | ○ | ○ | ○ | × | × | ○ | ○ |
| A4H | ○ | ○ | ○ | ○ | ○ | ○ | × |
| B4V | ○ | ○ | ○ | ○ | × | ○ | ○ |
| A3V | ○ | ○ | ○ | ○ | ○ | ○ | ○ |

DOCUMENT SIZE

IMAGE READING APPARATUS AND PROCESSING DEVICE WITH SPECIFIC ASSEMBLY FOR COVER OPEN/CLOSE DETERMINATION

INCORPORATED BY REFERENCE

The entire disclosure of Japanese Patent Application No. 2017-010447, filed Jan. 24, 2017 is expressly incorporated by reference herein.

BACKGROUND

1. Technical Field

The present disclosure relates to an image reading apparatus of a so-called scanner or the like and a processing device having an opening/closing cover.

2. Related Art

This type of image reading apparatus and the like, for example, has a structure for detecting the set document size by the apparatus itself, but when performing such detection, detection is performed with an opening/closing cover that is a document cover in a half open state. With the opening/closing cover in a fully-open state, a reflective optical sensor for detecting a document size is influenced by external light reducing detection precision, meanwhile in the fully-closed state, detection precision of the optical sensor is reduced since an opening/closing cover is often used in which reflectance of a document pressing mat ordinarily provided on the opening/closing cover is close to the reflectance of the document.

A separate sensor is provided to ascertain that the opening/closing cover is in the half-open state. JP-A-2016-119571 describes a structure in which a photo interrupter that is a transmission type optical sensor is used as a half-open grasp sensor, and the optical sensor is provided on a base point side of opening and closing swing of the opening/closing cover.

JP-A-2015-75645 is also an example in the related art that detects the document size. JP-A-2015-75645 discloses a structure in which an optical axis of the optical sensor for detecting the document size is inclined.

However, in the related art, since a structure for ascertaining a half-open state of an opening/closing cover is a structure that uses a transmission type optical sensor, there is a problem in which, in an optical sensor, detection precision is reduced over time due to environmental influence (unclean air and the like), or there is a problem in which the structure becomes complicated and costs increase by using the transmission type optical sensor.

SUMMARY

An advantage of some aspects of the disclosure is to realize a simple structure in which it is easy to ascertain the half-open state of the opening/closing cover, and to make it difficult for environmental influence to affect detection precision.

According to an aspect of the disclosure, there is provided an image reading apparatus including a document table that has a mounting surface on which a document is mounted, a document cover that rotates around a rotary shaft to be displaced between a closed state in which the document table is covered and an open state in which the document table is open, a pressing portion that is disposed on the side of the document table and presses a switch by receiving external force, a rotary lever that is disposed on the side of the document cover and is provided to be pivotable at a position at which it is possible to apply external force to the pressing portion, and a biasing member that applies biasing force in a direction in which one end side of the rotary lever moves away from the document cover, in which when the document cover is at a predetermined angle in a process of displacement from the open state to the closed state, the one end of the rotary lever applies the external force to the pressing portion to push down the pressing portion to change the state of the switch, and in the process of displacement from the predetermined angle to the closed state, the one end of the rotary lever rotates in a direction approaching the document cover against the biasing force and pushes down the pressing portion to maintain the state of the switch.

According to the present aspect, when the document cover is at a predetermined angle in a process of displacement from the open state to the closed state, the one end of the rotary lever applies the external force to the pressing portion to push down the pressing portion to change the state of the switch. For example, the state of the switch is changed from an OFF state to an ON state. Then, in the process of displacement of the document cover from the predetermined angle to the closed state, the one end of the rotary lever rotates in a direction approaching the document cover against the biasing force and pushes down the pressing portion to maintain the state of the switch.

Thereby, it is possible to ascertain the half-open state of the document cover by realizing a simple structure. In addition, since a transmission type optical sensor as in the related art is not used, it is possible to achieve a reduction of costs without complicating the structure, and it is possible to make it difficult for environmental influence to affect detection precision.

In this arrangement, in the present specification, the "half-open state" is used to mean a state of not being fully open or fully closed rather than half opened to the fully-open state.

The image reading apparatus provided with a cover side opening on the document cover, in which another end of the rotary lever is positioned within the cover side opening and the one end protrudes outside the cover side opening due to biasing force, and the rotary lever rotates with the other end side as a support point.

In this case, another end of the rotary lever is positioned within a cover side opening of the document cover and the one end protrudes outside the cover side opening due to biasing force, and the rotary lever rotates with the other end side as a support point. Thereby, it is possible to stably and rotatably operate the rotary lever.

In the image reading apparatus, when the document cover is in the closed state, the rotary lever is accommodated in the cover side opening against the biasing force in a state where at least a part of the one end side is in contact with the pressing portion.

In this case, when the document cover is in the closed state, the rotary lever is accommodated in the cover side opening. Thereby, it is possible to realize compactness in a height direction of the apparatus by providing the rotary lever.

In the image reading apparatus, the switch is disposed below the front surface of the document table in a vertical direction, and a part of the pressing portion that contacts the rotary lever protrudes from a document table side opening formed on the document table to the document cover side.

In this case, since only a part of the pressing portion from the document table protrudes to the document cover side, it is possible to stably perform switching of the switch between the ON state and the OFF state by an opening and closing operation of the document cover. That is, one end of the rotary lever abuts the pressing portion and pushes down the pressing portion to change the switch state, then one end of the rotary lever abuts with the front surface of the document table in the periphery of the document table side opening until the document cover transitions to the closed state, and downward movement thereafter is regulated to horizontally move so as to slide on the front surface of the document table. Thereby, it is possible to regulate the pressing height of the pressing portion to not press the switch, or prevent a defect due to excessive pressing.

The image reading apparatus of the aspect of the disclosure, further provided with a size detection mechanism that detects a size of a document that is mounted on the document table, in which the size detection mechanism is operated by a change of the state of the switch, as a trigger, in the process of the document cover being displaced from the open state to the closed state.

In this case, even in a case where a reflective optical sensor is used as a size detection mechanism in order to detect a document size, the document cover is set in the half-open state to be less likely to be affected by external light, it is possible to reduce a concern that a document pressing mat is misidentified as a document, and it is possible to ascertain the half-open state with a simple structure.

According to another aspect of the disclosure, there is provided a processing device including a main body portion, an opening/closing cover that rotates around a rotary shaft to be displaced between a closed state in which a surface of the main body portion is covered and an open state in which the surface of the main body portion is open, a pressing portion that is disposed on the side of the main body portion and presses a switch by receiving external force, a rotary lever that is disposed on the side of the opening/closing cover and is provided to be pivotable at a position at which it is possible for the pressing portion to apply external force, and a biasing member that applies biasing force in a direction in which one end side of the rotary lever moves away from the opening/closing cover, in which when the opening/closing cover is at a predetermined angle in a process of displacement from the open state to the closed state, the one end of the rotary lever applies the external force to the pressing portion to push down the pressing portion to change the state of the switch, and in the process of displacement from the predetermined angle to the closed state, the one end of the rotary lever rotates in a direction approaching the opening/closing cover against the biasing force and pushes down the pressing portion to maintain the state of the switch.

According to the present aspect, when the opening/closing cover is at a predetermined angle in a process of displacement from the open state to the closed state, the one end of the rotary lever applies the external force to the pressing portion to push down the pressing portion to change the state of the switch. For example, the state of the switch is changed from an OFF state to an ON state. Then, in the process of displacement of the opening/closing cover from the predetermined angle to the closed state, the one end of the rotary lever rotates in a direction approaching the opening/closing cover against the biasing force and pushes down the pressing portion to maintain the state of the switch.

Thereby, it is possible to ascertain the half-open state of the opening/closing cover by realizing a simple structure.

Since a transmission type optical sensor as in the related art is not used, it is possible to achieve a reduction of costs without complicating the structure, and it is possible to make it difficult for environmental influence or influence due to misidentification of the document pressing mat provided on the opening/closing cover to affect detection precision.

In this arrangement, in the present specification, the "half-open state" is used to mean a state of not being fully open or fully closed rather than half opened to the fully-open state.

BRIEF DESCRIPTION OF THE DRAWINGS

The disclosure will be described with reference to the accompanying drawings, wherein like numbers reference like elements.

FIG. 13 is an explanatory diagram representing with a diagram a relationship of an open or closed state of the document cover and output of an open or closed state detection sensor of the image reading apparatus according to the embodiment of the disclosure.

FIG. 14 is an explanatory diagram representing with a diagram a relationship of a faulty state and fault symbol of the open or closed state detection sensor of the image reading apparatus according to the embodiment of the disclosure.

FIG. 15 is an explanatory diagram representing with a diagram correspondence of a faulty state and each state of the open or closed state detection sensor of the image reading apparatus according to the embodiment of the disclosure.

FIG. 20 is an explanatory diagram representing with a diagram a relationship of the document size and detection of the document size detection sensor of the image reading apparatus according to the embodiment of the disclosure.

DESCRIPTION OF EXEMPLARY
EMBODIMENTS

Hereinafter, with reference to the drawings, detailed description will be made of an image reading apparatus and a processing device of the disclosure taking a so-called flat bed type image scanner as an example as an image reading apparatus according to an embodiment of the disclosure.

Note that, in the description below, an outline of an overall configuration of the image reading apparatus according to the embodiment of the disclosure will be described below based on, to begin with, FIGS. 1 to 3. Next, a relationship of a configuration of a rotary lever and a peripheral pressing portion that characteristically configure the image reading apparatus and state change of a switch executed via movement of the rotary lever corresponding to each open or closed state of a document cover and the pressing portion will be specifically described based on FIGS. 4 to 11.

Subsequently, an example of determination of presence or absence of the document executed by using the image reading apparatus according to the embodiment of the disclosure and the content of a detection process from detection of the open or closed state of the document cover to the document size detection will be described below in detail based on FIGS. 12 to 20.

Then, lastly, an embodiment in which a characteristic configuration of the image reading apparatus of the disclosure is applied to another apparatus (including the processing device of the disclosure) will be referred to in the description of other embodiments.

Figure 1:
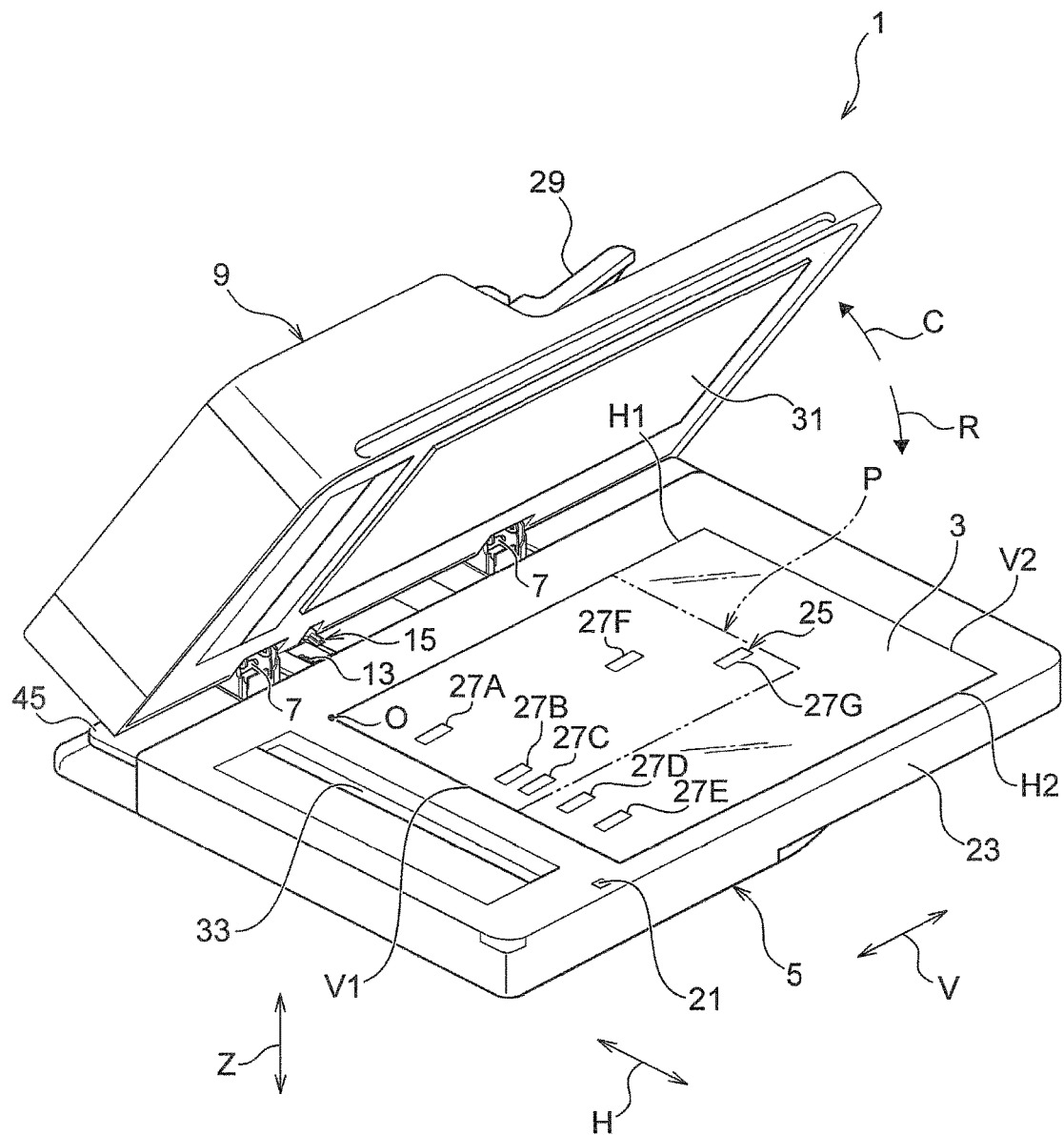
FIG. 1 is a perspective view representing an outer appearance of an open state of an image reading apparatus according to an embodiment of the disclosure.
Figure 2:
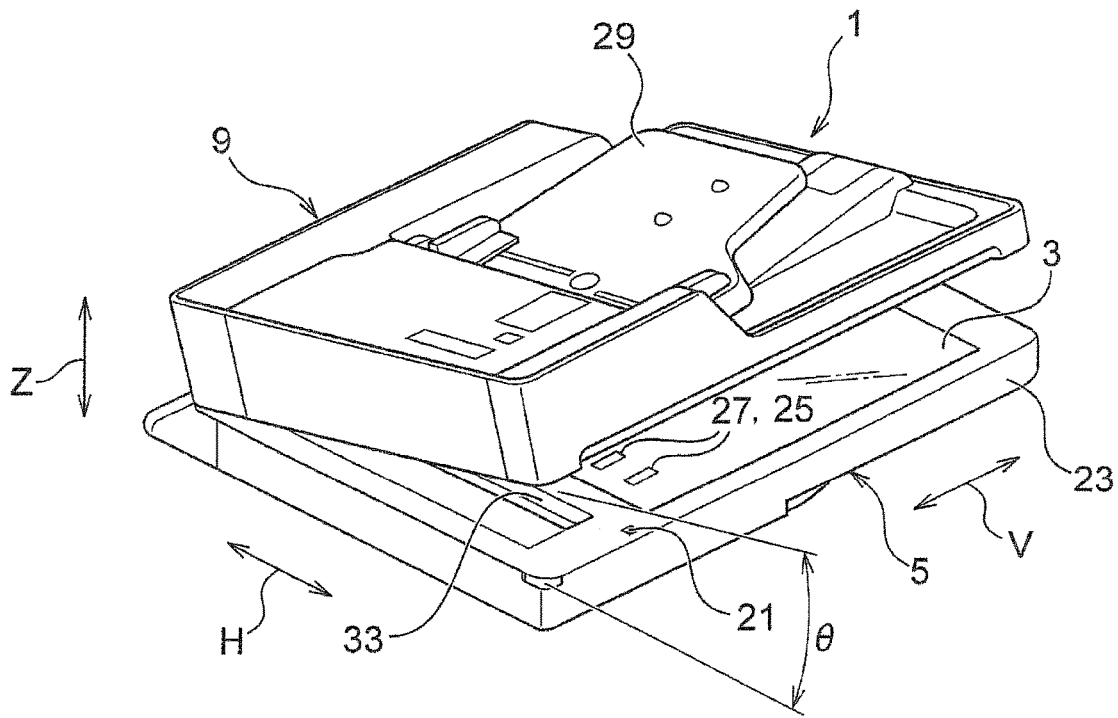
FIG. 2 is a perspective view representing an outer appearance of a half-open state of the image reading apparatus according to the embodiment of the disclosure.
Figure 3:
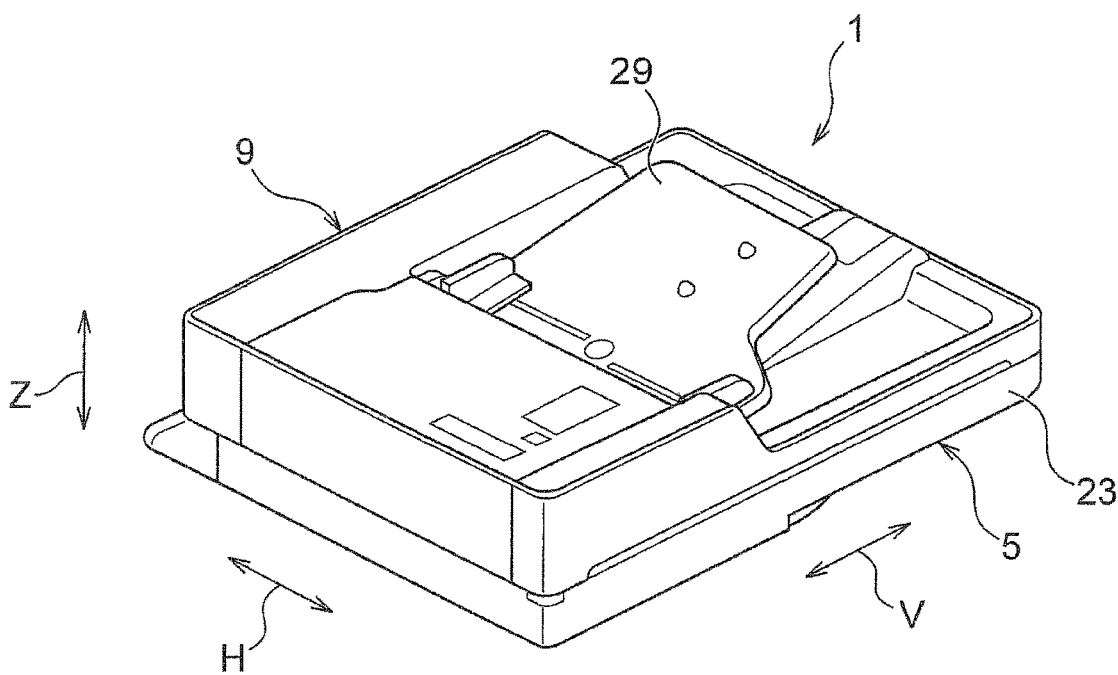
FIG. 3 is a perspective view representing an outer appearance of a closed state of the image reading apparatus according to the embodiment of the disclosure.

(1) Outline of Overall Configuration of Image
Reading Apparatus (Refer to FIGS. 1 to 3)

An image reading apparatus 1 according to an embodiment of an disclosure is basically configured provided with a document table 5 that has a mounting surface 3 on which a document P is mounted, a document cover 9 that is displaced to rotate centered on a rotary shaft 7 between a closed state in which the document table 5 is covered and an open state in which the document table 5 is open, as a document cover half-open state detection mechanism, a pressing portion 13 that is disposed on the side of the document table 5 and presses a switch 11 (refer to FIG. 7 and the like) for half-open state detection that is an open or closed state detection sensor by receiving external force F, a rotary lever 15 that is disposed on the side of the document cover 9 and is provided to be pivotable at a position at which it is possible to apply external force F to the pressing portion 13, and a biasing member 19 (refer to FIG. 6 and the like) that applies biasing force in a direction R in which one end 17 (refer to FIG. 4 and the like) side of the rotary lever 15 moves away from the document cover 9.

Then, when the document cover 9 is at a predetermined angle θ (for example, 20°±5°, preferably 18°) by a process of displacement from the open state to the closed state, one end 17 of the rotary lever 15 applies the external force F (refer to FIG. 8 and the like) to the pressing portion 13 to push down the pressing portion 13 to change the state (for example, ON state and OFF state) of the switch 11. In the process of displacement from the predetermined angle θ to the closed state, one end 17 of the rotary lever 15 rotates in a direction C approaching the document cover 9 against the biasing force and continues pushing down the pressing portion 13 to maintain the state of the switch 11.

In addition, in the embodiment of the illustration, a sensor 21 configured by a mechanical contact sensor as an example for detecting the closed state as an open or closed state detection sensor is provided at a position on a tip end 23 side on the apparatus front surface side in a front/rear direction H on the front surface of the document table 5.

Furthermore, a size detection mechanism 25 that is configured to be provided with, for example, seven document size detection sensors 27A, 27B, 27C, 27D, 27E, 27F, and 27G configured by an optical sensor below transparent glass and the like that forms the mounting surface 3 of the document table 5. Then, the orientation and size of the document P that is set to the mounting surface 3 of the document table 5 is detected by combining detection results of the seven document size detection sensors 27A to 27G.

Other than this, in the embodiment, an automatic document feeder (ADF) 29 and a document pressing mat 31 are provided on the document cover 9, and a reading portion 33 that reads content of the document P that is set on the mounting surface 3 is provided in the vicinity of a left end in a left and right direction V on the mounting surface 3 of the document table 5.

Note that, in the description below, defined for convenience of description, a state in which the document cover 9 represented in FIG. 1 is fully opened is described as a fully-open state, a state up to before detection in a half-open state represented in FIG. 2 is started from the fully-open state is described as an open state, a state from the state represented in FIG. 2 up to before reaching a state represented in FIG. 3 is described as a half-open state, and a state in which the mounting surface 3 of the document table 5 is closed by completely closing the document cover 9 represented in FIG. 3 is described as a closed state or a fully-closed state.

In addition, the left and right direction of the mounting surface 3 of the document table 5 is set as V, the front/rear direction is set as H, and a left-rear corner portion of the mounting surface 3 is set to a reference point O that is referenced when the document P is set. Furthermore, the end portion on the reference point O side of the left and right direction V is defined as a reading start end V1, the end portion on an opposite side is defined as an end point of reading V2, the end portion on the reference point O side of the front/rear direction H is defined as a reading start end H1, and the end portion on the opposite side is defined as an end point of reading H2.

(2) Configuration of Rotary Lever and Pressing Portion Periphery (Refer to FIGS. 4 to 11)

Figure 7:
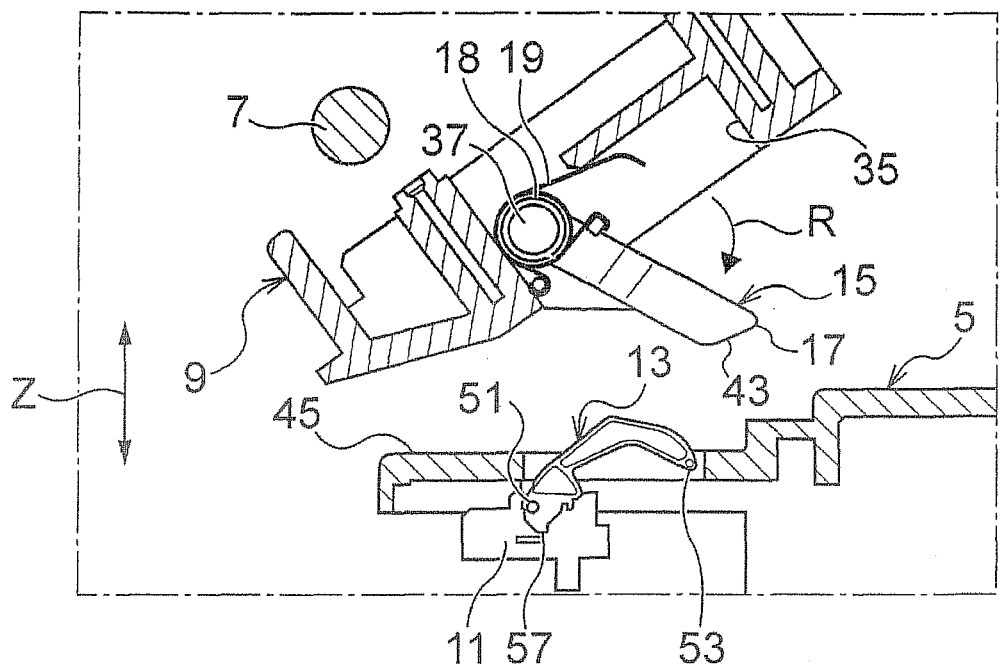
FIG. 7 is a side sectional view representing a positional relationship of the rotary lever and the pressing portion in the open state of the image reading apparatus according to the embodiment of the disclosure.

As represented in FIG. 7, the cover side opening 35 is provided on the document cover 9. The rotary lever 15 is configured such that the other end 18 is positioned within the cover side opening 35, the one end 17 of the rotary lever 15 protrudes outward of the cover side opening 35 by biasing force of the biasing member 19, and the rotary lever 15 rotates with the other end 18 side of the rotary lever 15 as a support point.

Figure 9:
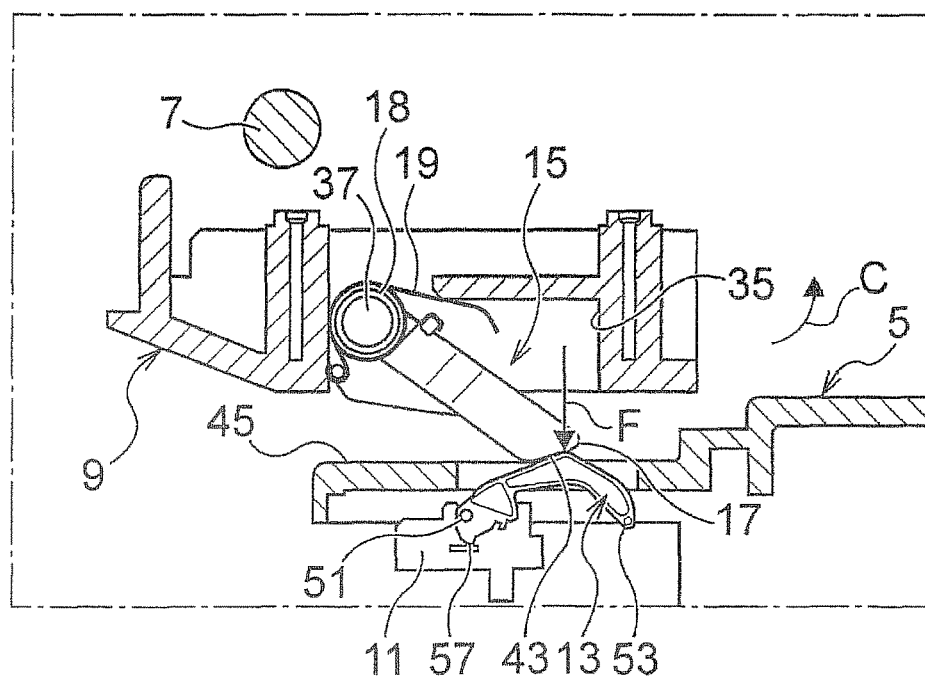
FIG. 9 is a side sectional view representing a positional relationship of the rotary lever and the pressing portion in the closed state of the image reading apparatus according to the embodiment of the disclosure.

Specifically, as represented in FIG. 9, when the document cover 9 is in the closed state, the cover side opening 35 is provided of a predetermined depth of a size at which it is possible to accommodate the rotary lever 15 at a position close to the rotary shaft 7 on a lower surface facing the mounting surface 3 of the document table 5. A rotary shaft 37 horizontally bridges a back portion close to the rotary shaft 7 of the cover side opening 35.

Figure 5:
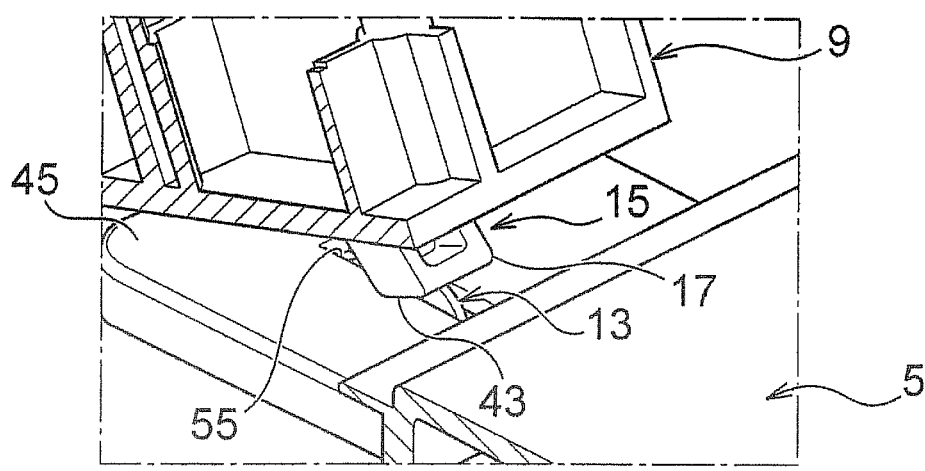
FIG. 5 is a perspective view representing a positional relationship of the rotary lever and the pressing portion in the half-open state of the image reading apparatus according to the embodiment of the disclosure.
Figure 8:
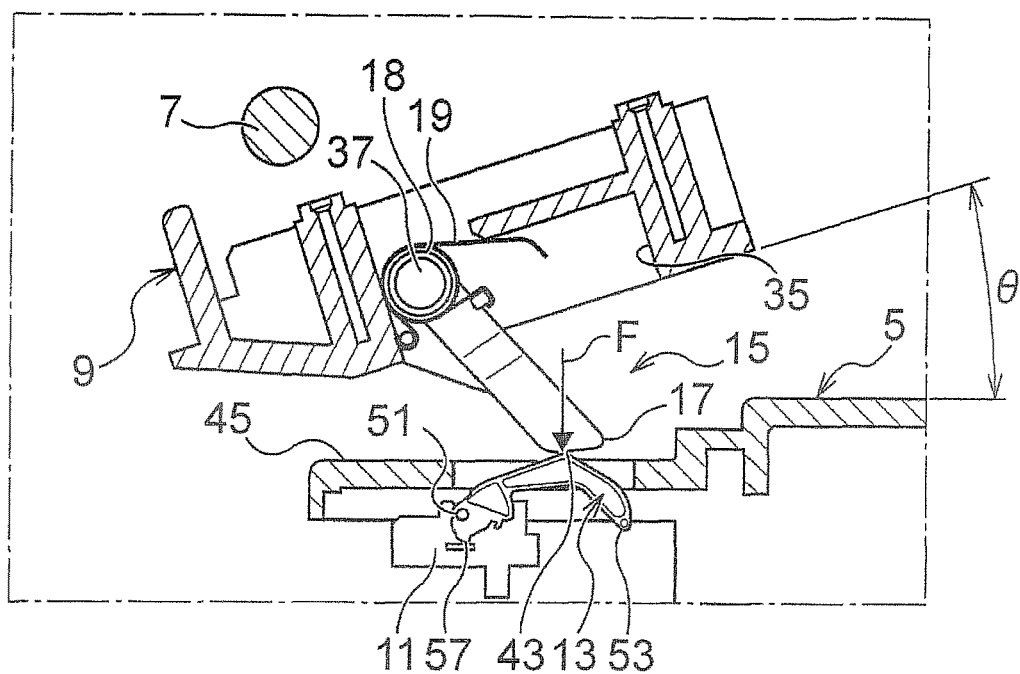
FIG. 8 is a side sectional view representing a positional relationship of the rotary lever and the pressing portion in the half-open state of the image reading apparatus according to the embodiment of the disclosure.
Figure 11:
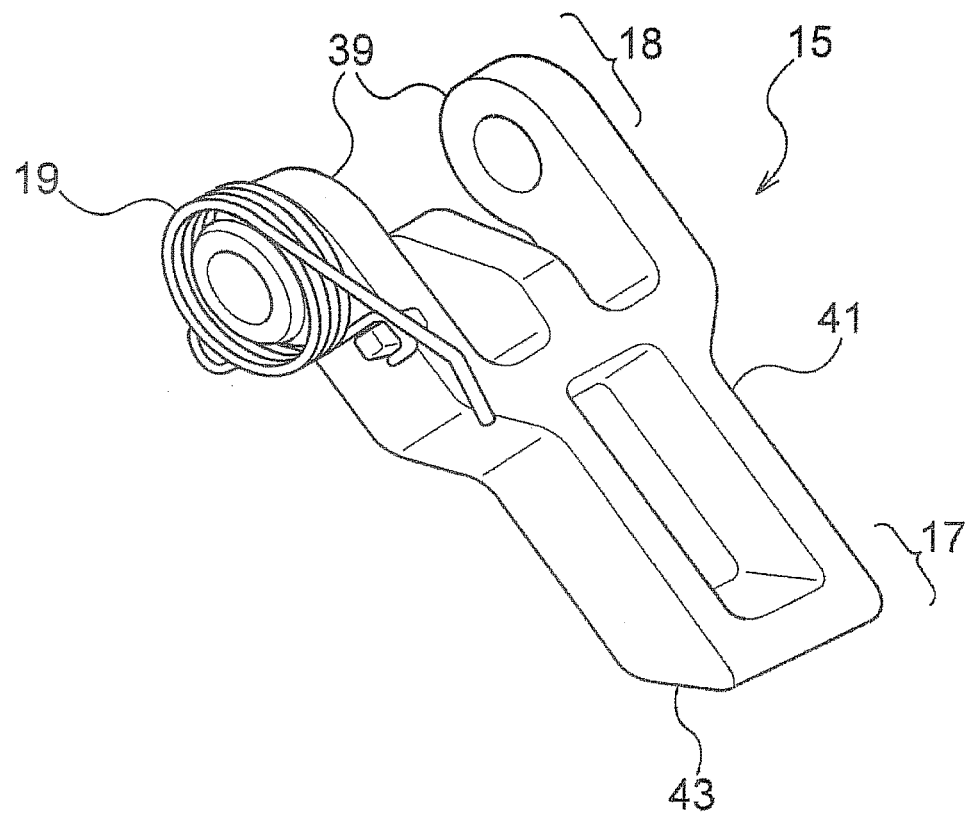
FIG. 11 is a perspective view representing the rotary lever and a biasing member of the image reading apparatus according to the embodiment of the disclosure.

As represented in FIG. 11, in the rotary shaft 37, bearings 39 and 39 are configured by branching the other end 18 in two, the rotary lever 15 is mounted that has a lever main body 41 that extends from the bearings 39 and 39 toward one end 17 and an abutting surface 43 cut diagonally so as to be substantially parallel to the upper surface of the support plate portion 45 formed extending outward from the reading start end H1 in the mounting surface 3 of the document table 5 in a state of reaching the half-open state represented in FIGS. 5 and 8 on the one end 17.

In addition, for example, a coil portion of the biasing member 19 that is configured by a torsion coil spring is fitted externally to the outer periphery of one bearing 39. The rotary lever 15 constantly applies biasing force so as to protrude in the direction R (FIGS. 1 and 7) in which the rotary lever 15 moves away from the document cover 9 by one end of the torsion coil spring being engaged with the rotary lever 15 and the other end being engaged with an appropriate part of a member on which the cover side opening 35 of the document cover 9 is formed.

Figure 6:
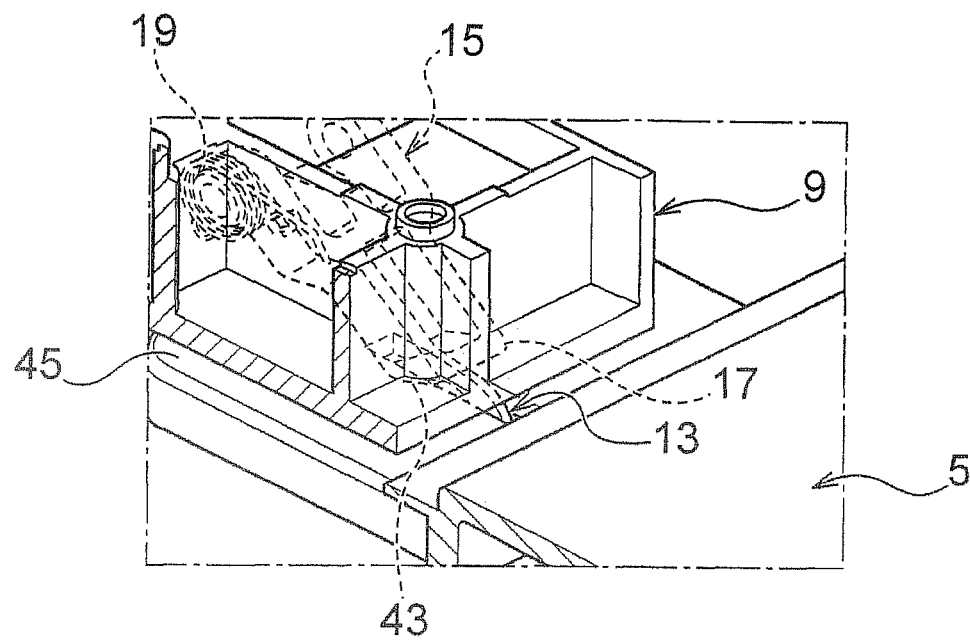
FIG. 6 is a perspective view representing a positional relationship of the rotary lever and the pressing portion in the closed state of the image reading apparatus according to the embodiment of the disclosure.

In addition, when the document cover 9 is in the closed state represented in FIGS. 6 and 9, the rotary lever 15 is configured so as to be accommodated in the cover side opening 35 against the biasing force in a state where at least a part of the one end 17 side is in contact with and presses down the pressing portion 13.

The pressing portion 13 is a curved wing plate shape member swinging with a swinging free end 53 with a swing shaft 51 that is provided on the rotary shaft 7 side of the support plate portion 45 as a support point, and a swing shaft base portion 57 of the pressing portion 13 is an action point at which the state of the switch 11 is changed.

Figure 10:
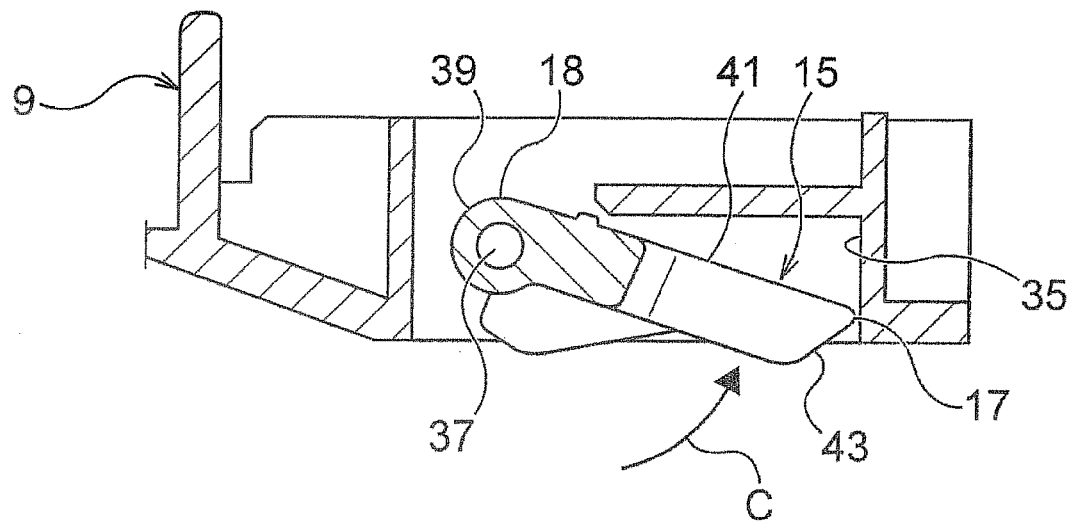
FIG. 10 is a side sectional view representing an accommodation state of the rotary lever when stored in a document cover of the image reading apparatus according to the embodiment of the disclosure.

Then, as represented in FIGS. 9 and 10, when the document cover 9 is in the closed state, a part of the abutting surface 43 that is formed on the one end 17 of the rotary lever 15 abuts a part of the curved upper surface of the pressing portion 13, the pressing portion 13 is pressed down, and an amount according to an amount of rotation is accommodated in the cover side opening 35 in order to rotate the rotary lever 15 in an accommodating direction C by the abutting surface 43 abutting the upper surface of the support plate portion 45.

(3) Relationship of Open or Closed State of Document Cover and State Change of Movement of Rotary Lever and Switch (Refer to FIGS. 4 to 9)

Next, the open or closed state of the document cover 9 is divided into three stages of (A) the open state, (B) the half-open state, and (C) the closed state, and a relationship of movement of the rotary lever 15 corresponding to each of the open or closed states and a change in state of the switch 11 that is executed through the pressing portion 13 will be specifically described.

Figure 4:
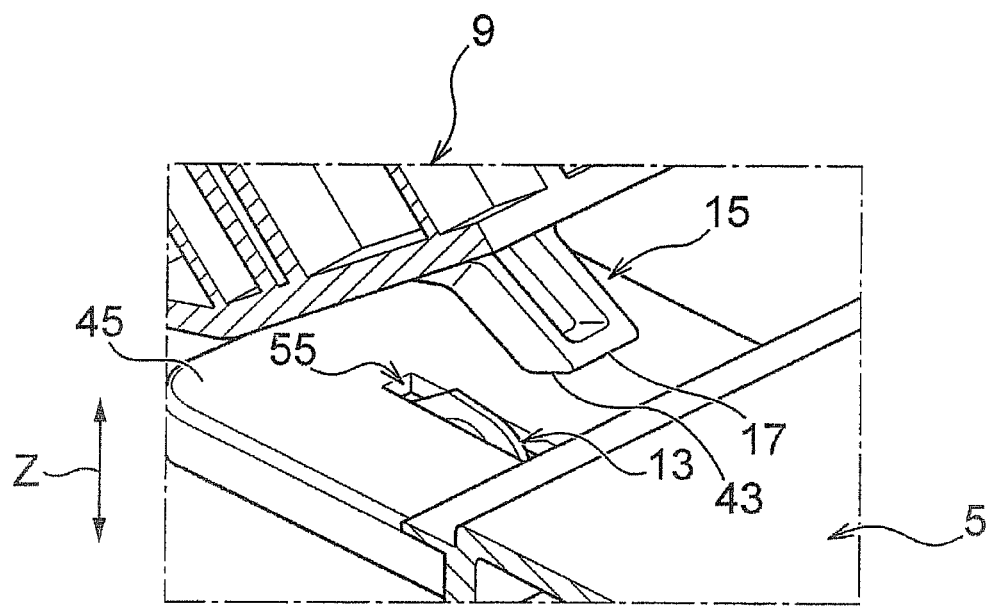
FIG. 4 is a perspective view representing a positional relationship of a rotary lever and a pressing portion in the open state of the image reading apparatus according to the embodiment of the disclosure.

(A) Open State (Refer to FIGS. 4 and 7)

When the document cover 9 is in the open state, a state in which the one end 17 side of the rotary lever 15 is fully rotated in the protruding direction R by the biasing force of the biasing member 19. In addition, the one end 17 of the rotary lever 15 is positioned at an upper position separated from the upper surface of the pressing portion 13 that protrudes upward from a document table side opening 55 which is formed on the support plate portion 45, and the state of the switch 11 is not changed (for example, in the OFF state).

In the embodiment, the switch 11 is disposed below the front surface of the support plate portion 45 of the document table 5 in a vertical direction Z, only a part that contacts the abutting surface 43 of the one end 17 of the rotary lever 15 in the pressing portion 13 that has a swing shaft base portion 57 that acts on the switch 11 protrudes from the document table side opening 55 to the document cover 9 side.

Then, in a state in which the abutting surface 43 of the rotary lever 15 does not abut with the pressing portion 13, the pressing portion 13 is positioned at an upper limit position, and displacement to the state of the switch 11 is not brought about (for example, in the OFF state with no change).

(B) Half-Open State (Refer to FIGS. 5 and 8)

When the document cover 9 reaches the half-open state by rotating in the closed direction, the abutting surface 43 that is provided on the one end 17 of the rotary lever 15 is substantially parallel to the front surface of the support plate portion 45, one part of the abutting surface 43 abuts with an appropriate position on the upper surface of the pressing portion 13 and the pressing portion 13 is caused to swing in a direction in which the swinging free end 53 side is displaced downward with the swing shaft 51 as a support point.

Thereby, the state is changed (for example, comes to be in the ON state) by the switch 11 receiving the external force F in a direction of being pressed downward from the swing shaft base portion 57. Meanwhile, the position (angle) if the rotary lever 15 at this time is the same as the open state of (A). That is, a state in which the one end 17 side of the rotary lever 15 is fully rotated in the protruding direction R by the biasing force of the biasing member 19.

(C) Closed State (Refer to FIGS. 6 and 9)

When the document cover 9 reaches the closed state by further rotating in the closed direction, downward movement thereafter is regulated by the abutting surface 43 that is formed on the one end 17 of the rotary lever 15 abutting on the front surface of the support plate portion 45.

Thereby, the rotary lever 15 is rotated in the accommodating direction C against the biasing force of a biasing member 19 with the rotary shaft 37 as a support point, and a predetermined amount according to the rotation angle is accommodated inside the cover side opening 35.

Meanwhile, in a state in which the abutting surface 43 that is formed on the one end of 17 of the rotary lever 15 abuts with the front surface of the support plate portion 45 on the periphery of the cover side opening 35, the abutting surface 43 horizontally moves so as to slide toward the base end portion of the abutted support plate portion 45.

The swing angle of the pressing portion 13 at this time is the same as the half-open state of (B), and the switch 11 is maintained in the changed state (for example, the ON state) without any changes. Thereby, it is possible to reduce the occurrence of defects such as insufficient pushing and excessive pushing causing damage to the switch 11 that cause the switch 11 to return to the original state (for example, set to the OFF state).

(4) Content of Presence or Absence of Document, Open or Closed State of Document Cover, and Detection Process of Document Size (Refer to FIGS. 12 to 20)

In the embodiment, there is a configuration such that the size detection mechanism 25 is provided that detects the size of the document P that is mounted in the document table 5 as described above, and the size detection mechanism 25 is operated by a change of the state of the switch 11, as a trigger, in the process of the document cover 9 being displaced from the open state to the closed state.

An example of determination of presence or absence of the document P executed by using the image reading apparatus 1 according to the embodiment of the disclosure and the content of a detection process from detection of the open or closed state of the document cover 9 to the document P size detection will be described below in detail based on FIGS. 12 to 20.

Figure 12:
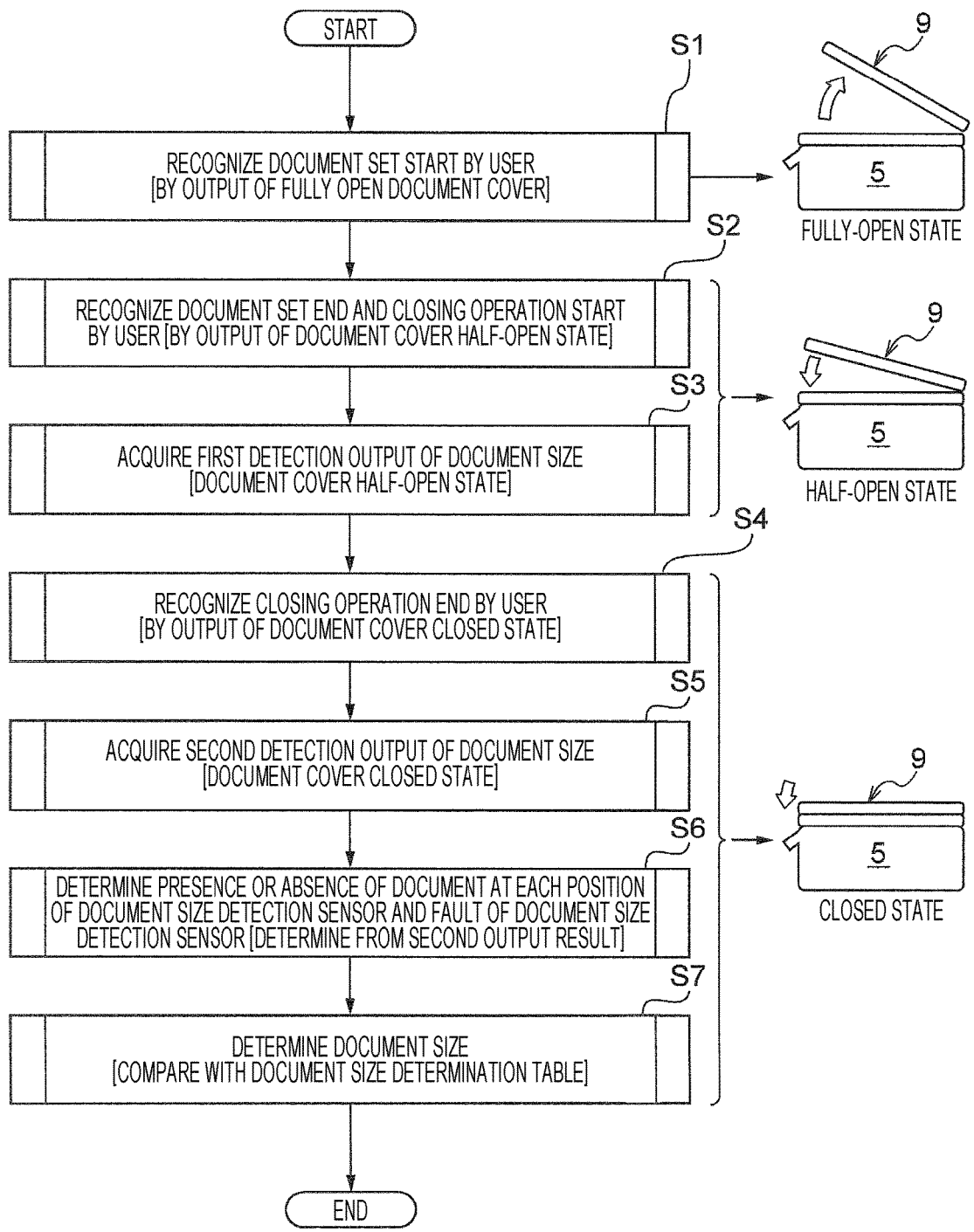
FIG. 12 is a flow chart and a conceptual diagram representing a concept of flow of a document size detection process of the image reading apparatus according to the embodiment of the disclosure.

(A) Concept of Flow of Document Size Detection Process (Refer to FIG. 12)

In this arrangement, the document size detection process is a process for automatically determining the document size when reading the document P, and making the user operation convenient. Then, the document size is determined according to detection output of a total of seven document size detection sensors 27 of five document size detection sensors 27A, 27B, 27C, 27D, and 27E that are disposed with appropriate gaps open in the front/rear direction H in the vicinity of the reading start end V1 in the left and right direction V of the document table 5 and two document size detection sensors 27F and 27G that are disposed at respectively different positions in the left and right direction V and the front/rear direction H with an appropriate gap open from the reading start end V1.

That is, the open or closed state of the document cover 9 when the document P is set on the document table 5 is detected by the switch 11 and the sensor 21, and the size of the document P is specified by determining the presence or absence of the document P at a position of each document size detection sensor 27 and the presence or absence of a fault of the document size detection sensor 27 from the detection output of the seven document size detection sensors 27 in the two states of the half-open state and the closed state.

The document size detection process is started by detection of the fully-open state of the document cover 9, but the document size detection process is not implemented during image reading, when an error occurs during image reading, during use of the automatic document feeder (ADF) 29, and when an error occurs during automatic document feeding.

Specifically, the size detection process of the document P is implemented by the following flow. First, the start of setting of the document P is recognized by a user according to detection of the fully-open state of the document cover 9 according to step S1 in FIG. 12. Next, the process transitions to step S2, the end of setting of the document P and the start of a closing operation is recognized by the user according to detection (according to switch 11 of document cover half-open state detection mechanism) of the half-open state of the document cover 9.

Next, the process transitions to step S3, and first detection output of the document size is acquired in the half-open state of the document cover 9. Next, the process transitions to step S4, the end of the closing operation by the user according to detection (according to sensor 21 for closed state detection) of the closed state of the document cover 9.

Next, the process transitions to step S5, and second detection output of the document size is acquired in the closed state of the document cover 9. Next, the process transitions to step S6, and determination of presence or absence of the document P and a fault of the document size detection sensor 27 are determined at seven locations at which the document size detection sensors 27 are disposed from two output results.

Next, the process transitions to step S7, and the size of the document P is determined by comparing the determination result with a determination table.

(B) Relationship of Open or Closed State of Document Cover and Output of Open or Closed State Detection Sensor (Refer to FIG. 13)

The open or closed state of the document cover 9 is detected by output of two open or closed state detection sensors of the switch 11 for half-open state detection and the sensor 21 for closed state detection.

The relationship of the output of each sensor 11 and 21 and the open or closed state of the document cover 9 is as represented in FIG. 13. That is, in a case of a state 1 in which the output signal of the sensor 21 is L (for example, ON state) and the output signal of the switch 11 is also L (for example, ON state), it is detected that the document cover 9 is in the closed state.

In a case of a state 2 in which the output signal of the sensor 21 is H (for example, OFF state) and the output signal of the switch 11 is L (for example, ON state), the half-open state is detected. In a case of a state 3 in which the output signal of the sensor 21 is L (for example, ON state) and the output signal of the switch 11 is H (for example, OFF state), although not actually existing, the state 3 handles operation in the open state.

In a case of a state 4 in which the output signal of the sensor 21 is H (for example, OFF state) and the output signal of the switch 11 is H (for example, OFF state), the open state is detected.

(C) Relationship of Fault State or Fault Signal of Open or Closed State Detection Sensor (Refer to FIG. 14)

The sensor 21 for closed state detection and the switch 11 for half-open state detection may each be independently faulty. The faulty states thereof are classified as represented in FIG. 14, correspondence other than the determination of the open or closed state of the document cover 9 in each faulty state, that is, correspondence of no problem even if there is a fault is performed. Accordingly, even in a case where faults occur in the sensor 21 and the switch 11, there is no hard error.

Specifically, a fault symbol Err-L is output to perform a process in a case where the sensor 21 and the switch 11 are faulty in the state of the output signal L (for example, ON state). A fault symbol Err-H is output to perform a process in a case where the sensor 21 and the switch 11 are faulty in the state of the output signal H (for example, OFF state).

Then, a fault symbol Normal is output to perform a process in a case where the sensor 21 and the switch 11 are normally operated.

(D) Correspondence of Fault State and Each State of Open or Closed State Detection Sensor (Refer to FIG. 15)

Correspondence is represented in FIG. 15 in a case where a fault symbol is output from the sensor 21 for closed state detection and the switch 11 for half-open state detection. Specifically, in a case where the sensor 21 is Normal and the switch 11 is also Normal, both are normal, and therefore normally operate and the process transitions to a document size detection process sequence that is subsequently described. In addition, the process does not transition to the document size detection process sequence since the open state (state 4 in FIG. 13) is not recognized in the case where the switch 11 is Err-L when the sensor 21 is Normal.

The open state (state 4 in FIG. 13) is recognized in the case when the switch 11 is Err-H when the sensor 21 is Normal and the process transitions to the document size detection process sequence, but the processes thereafter are not performed since the half-open state (state 2 in FIG. 13) thereafter is not recognized. In addition, the process does not transition to the document size detection process sequence since the open state (state 4 in FIG. 13) is not recognized in the case where the switch 11 Normal when the sensor 21 is Err-L.

The process does not transition to the document size detection process sequence since the open state (state 4 in FIG. 13) is not recognized in the case where the switch 11 is also Err-L when the sensor 21 is Err-L. In addition, the process does not transition to the document size detection process sequence since the open state (state 4 in FIG. 13) is not recognized in the case where the switch 11 is Err-H when the sensor 21 is Err-L.

Since the open state (state 4 in FIG. 13) is recognized in the case where the switch 11 is Normal when the sensor 21 is Err-H, the process transitions to the document size detection process sequence, the process is performed without any changes since the half-open state (state 2 in FIG. 13) is recognized, and the processes thereafter are not performed since the closed state (state 1 in FIG. 13) is not recognized.

The process does not transition to the document size detection process sequence since the open state (state 4 in FIG. 13) is not recognized in the case where the switch 11 is Err-L when the sensor 21 is Err-H.

In addition, the process does not transition to the document size detection process sequence since the open state (state 4 in FIG. 13) does not change in the case where the switch 11 is also Err-H when the sensor 21 is Err-H.

Figure 16A:
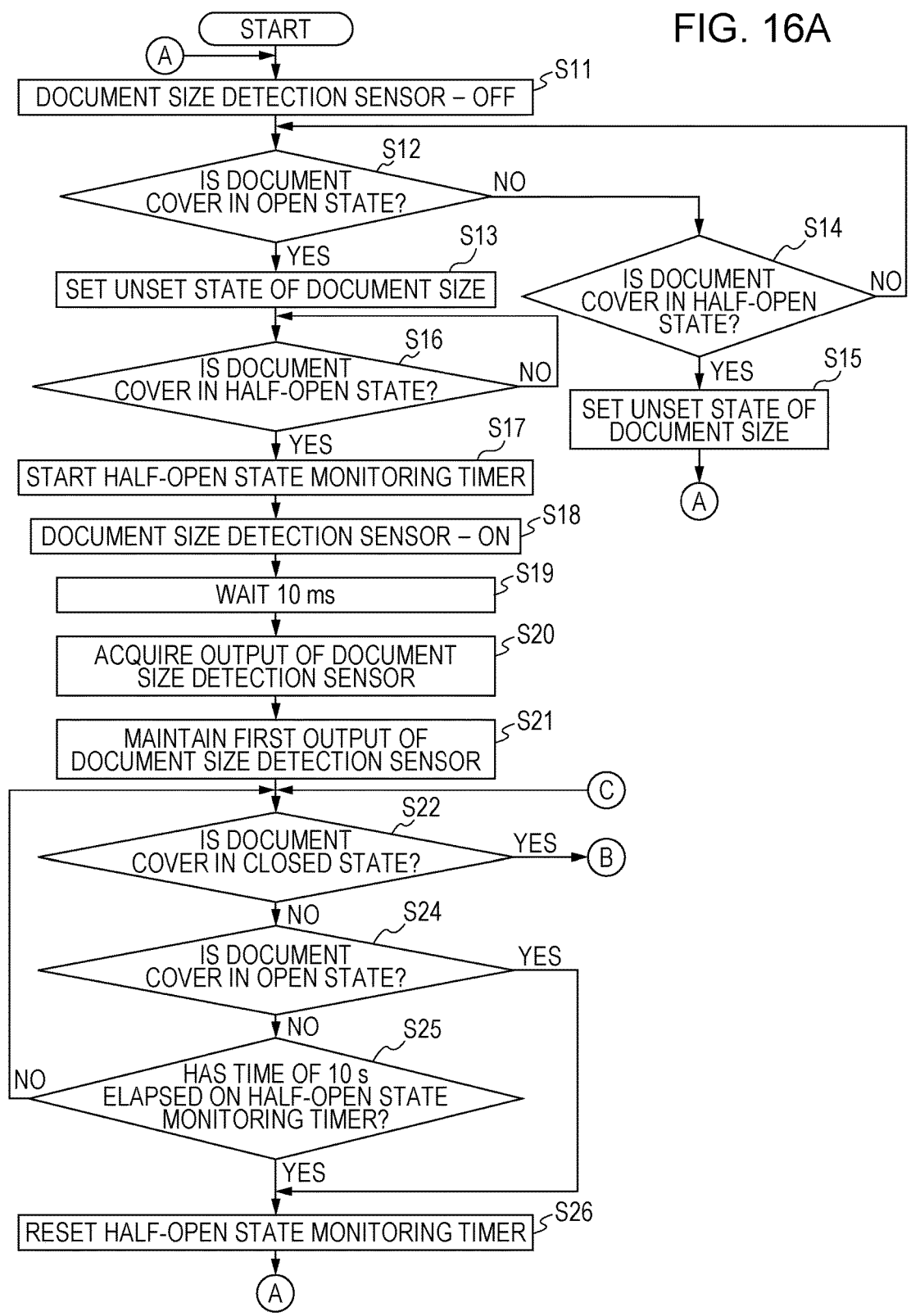
FIG. 16 is a flow chart representing flow of a document size detection process sequence of the image reading apparatus according to the embodiment of the disclosure.
Figure 16B:
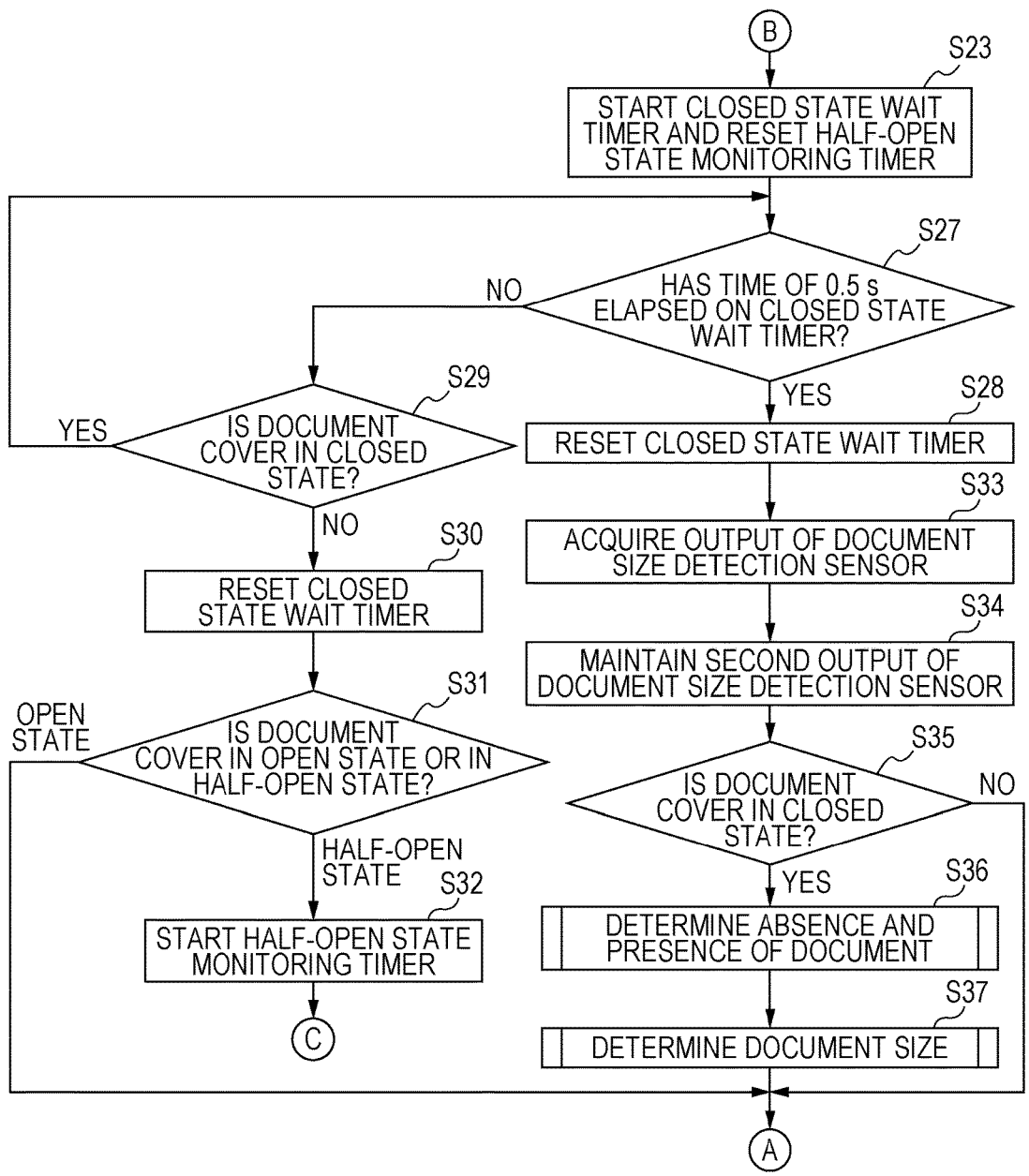

(E) Flow of Document Size Detection Process Sequence (Refer to FIG. 16)

The following processes are performed as a consideration or a preliminary treatment in a case where the following sequence is executed. First, when the power source is ON and during low power transition, the size of the document P performs the process as an indefinite state. In addition, when the document cover 9 is in the open state and when the document cover 9 is in the half-open state, the process does not transition to low power.

In addition, the process exits the sequence and transitions to another sequence if the other sequence of reading or the like is called. The flow of the document size detection process sequence will be described below in detail based on FIG. 16.

First, all of the seven document size detection sensors 27A to 27G are set to the OFF state in step S11. Next, the process transitions to step S12 and determination is made of whether or not the document cover 9 is in the open state. In a case where the open state is determined in step S12, the process transitions to step S13 and the size of the document P is set to the indefinite state.

Meanwhile, in a case where the open state is not determined in step S12, the process transitions to step S14 and determination is made of whether or not the document cover 9 is in the half-open state. In a case where the half-open state is determined in step S14, the process transitions to step S15 and the size of the document P is set to the indefinite state, the process returns to step S11, and the process of step S11 and thereinafter are repeatedly executed.

In addition, the process transitions to step S13, then the process transitions to step S16 and determination is made of whether or not the document cover 9 is in the half-open state. In a case where the half-open state is determined in step S16, the process transitions to step S17 and measurement of a half-open state monitoring timer starts. Note that, in step S16, in a case where the half-open state is not determined, the process returns to step S16 and the process of step S16 is repeated until the half-open state is reached.

After transitioning to step S17, the process transitions to step S18, and all of the seven document size detection sensors 27A to 27G are set to the ON state. Next, the process transitions to step S19 and waits for 10 ms, the process transitions to step S20 and detection output of seven document size detection sensors 27A to 27G is acquired, the process transitions to step S22, and the acquired seven detection outputs are held as the first output of the document size detection sensor.

Next, the process transitions to step S22 and determination is made of whether or not the document cover 9 is in the closed state. In a case where the closed state is determined in step S22, the process transitions to step S23, measurement of a closed state wait timer starts and the half-open state monitoring timer is reset.

Meanwhile, in a case where the closed state is not determined in step S22, the process transitions to step S24 and determination is made of whether or not the document cover 9 is in the open state, in a case where the document cover 9 is determined to be in the open state, the process transitions to step S26 and the half-open state monitoring timer is reset, then the process returns to step S11, and step S11 and the processes thereinafter are executed again. In addition, in a case where the open state is not determined in step S24, the process transitions to step S25 and determination is made of whether or not the half-open state monitoring timer elapses 10 s, in a case where it is determined that 10 s has elapsed, the process transitions to step S26 and the half-open state monitoring timer is reset, then the process returns to step S11, in a case where it is determined that 10 s has not elapsed, the process returns to step S22, and step S22 and the processes thereinafter are executed again.

In addition, the process transitions to step S23, then the process transitions to step S27, and determination is made of whether or not the closed state wait timer elapses 0.5 s. In a case where it is determined that 0.5 s has elapsed in step S27, the process transitions to step S28 and the closed state wait timer is reset.

Meanwhile, in a case where it is determined that 0.5 s has not elapsed in step S27, the process transitions to step S29 and determination is made again of whether or not the document cover 9 is in the closed state. In a case where the closed state is determined in step S29, the process returns to step S27 and the process of step S27 and thereinafter are executed again.

In addition, in a case where the closed state is not determined in step S29, the process transitions to step S30 and the closed state wait timer is reset, then the process transitions to step S31 and determination is made of whether the document cover 9 is in the open state or the half-open state.

In a case where the open state is determined in step S31, the process returns to step S11 and the process of step S11 and thereinafter are executed again. Meanwhile, in a case where the half-open state is determined in step S31, the process transitions to step S32 and measurement of the half-open state monitoring timer starts, and the process returns to step S22 and the process of step S22 and thereinafter are executed again.

In addition, it is determined that 0.5 s has elapsed in step S27 and the process transitions to step S28, then the process transitions to step S33, and detection output of the seven document size detection sensors 27A to 27G are acquired. Next, the process transitions to step S34, and the acquired seven detection outputs are held as the second detection output of the document size detection sensor.

Next, the process transitions to step S35, determination is made of whether or not the document cover 9 is in the closed state, in a case where the closed state is determined, the process transitions to step S36, presence or absence determination is made of the document P represented in FIG. 17 that will be subsequently described, the process transitions to step S37, and size determination is made of the document P represented in FIG. 18, then the process returns to step S11 and the process of step S11 and thereinafter are executed repeatedly.

Note that, in a case where the closed state is not determined in step S35, the process immediately returns to step S11 and the process of step S11 and thereinafter are executed again.

Figure 17:
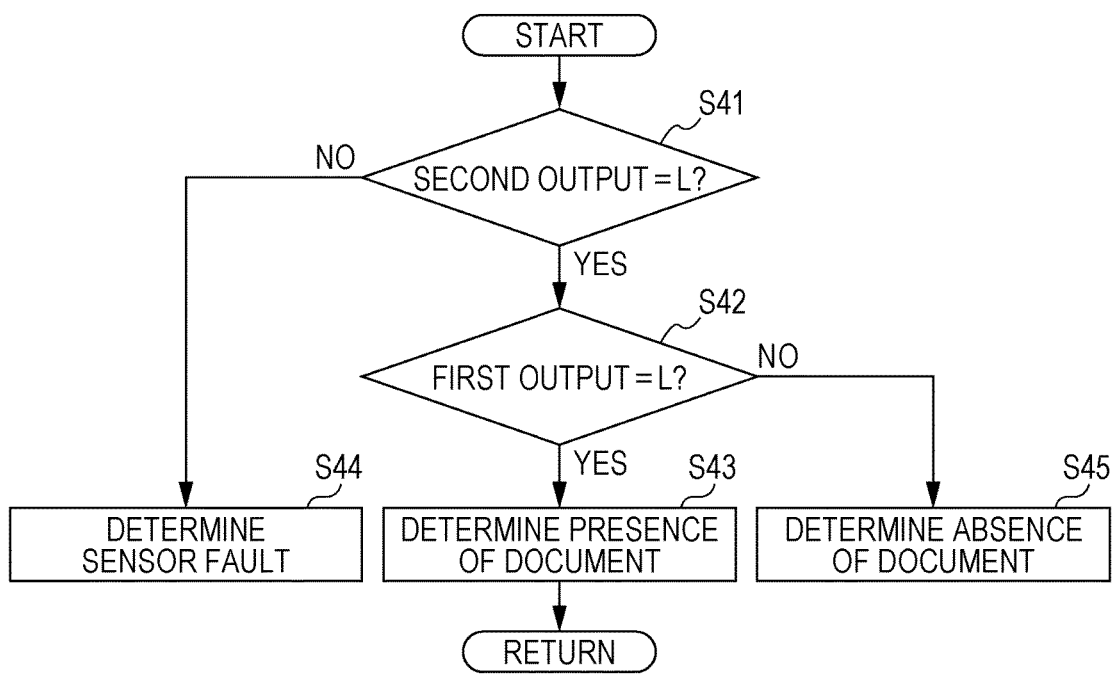
FIG. 17 is a flow chart representing flow of presence or absence determination of a document of the image reading apparatus according to the embodiment of the disclosure.

(F) Flow of Presence or Absence Determination of Document (Refer to FIG. 17)

In a case where it is determined that the document cover 9 is in the closed state in step S35 of FIG. 16, presence or absence determination of the document P represented in FIG. 17 is executed for all seven document size detection sensors 27A to 27G.

First, in step S41, determination is made of whether or not the second detection output of the held document size detection sensor 27 is L (for example, ON state) in step S34 in FIG. 16. In step S41, the process transitions to step S42 in a case where L (for example, ON state) is determined, and determination is made of whether or not the first detection output of the held document size detection sensor 27 is L (for example, ON state) in step S21 in FIG. 16.

In step S42, the process transitions to step S43 in a case where L (for example, ON state) is determined, it is determined that the document P is present, the process transitions to step S37 in FIG. 16, and size determination is executed of the document P which will be subsequently described.

In addition, in step S41, the second detection output of the document size detection sensor 27 is determined as H (for example, OFF state), the process transitions to step S44 and fault determination is made of the seven document size detection sensors 27A to 27G.

In addition, in step S42, the first detection output of the document size detection sensor 27 is determined as H (for example, OFF state), the process transitions to step S45 and it is determined that the document P is not present.

Figure 18:
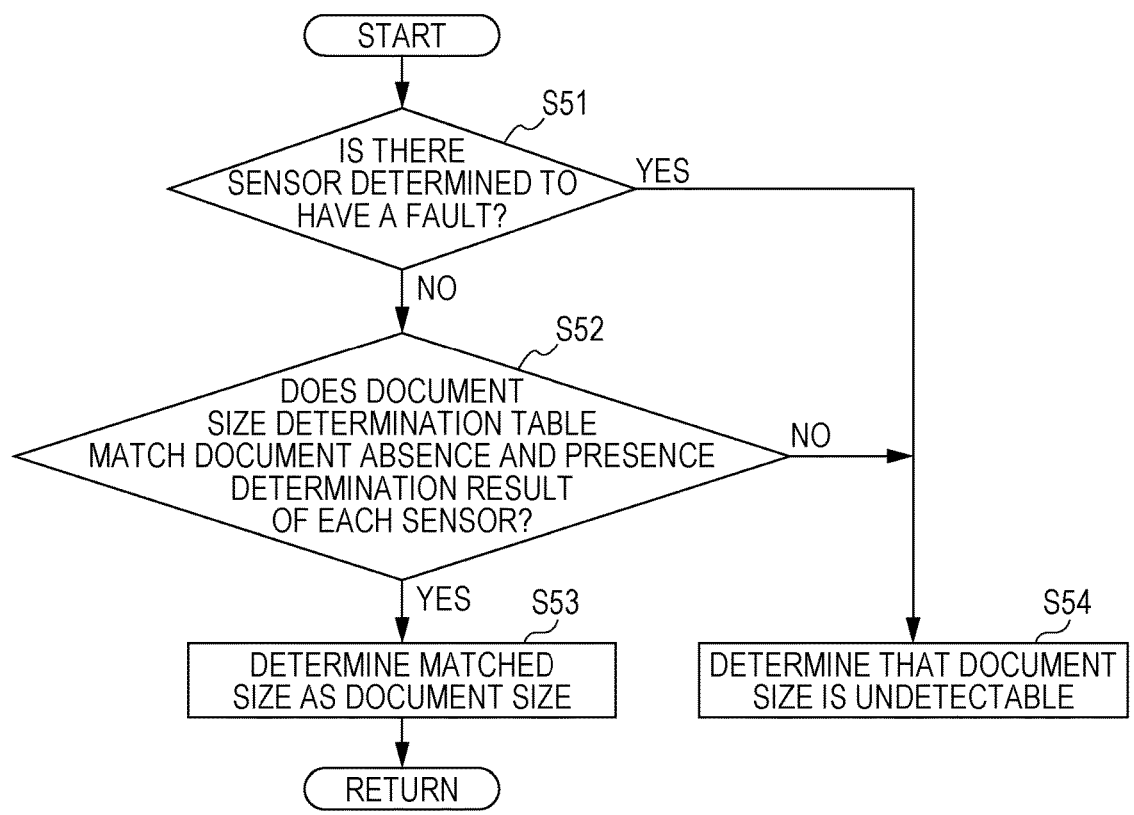
FIG. 18 is a flow chart representing flow of size determination of the document of the image reading apparatus according to the embodiment of the disclosure.

(G) Flow of Size Determination of Document (Refer to FIG. 18)

When presence or absence of the document P is determined according to the flow chart represented in FIG. 17, the process transitions to step S37 in FIG. 16 and size determination of the document P is executed.

First, in step S51, determination is made of whether the sensor that is determined to be faulty out of the seven document size detection sensors 27A to 27G is present or absent. In step S51, in a case where it is determined that there is no sensor that is determined to be faulty, the process transitions to step S52, and determination is made of whether or not the results of the presence or absence determination of the document P in each of sensors 27A to 27G matches the size determination table of the document P represented in FIG. 20 which will be subsequently described.

In step S52, in a case where it is determined that the size determination table of the document P is matched, the process transitions to step S53, and determination is made of the size of the document P for which the size of the matched document P is set.

Meanwhile, in step S51, in a case where it is determined that there is a sensor 27 that is determined to be faulty, and in step S52, in a case where it is determined that the size determination table of the document P is not matched, the process transitions to step S54, and determination is made that the size detection of the document P is not possible.

Figure 19:
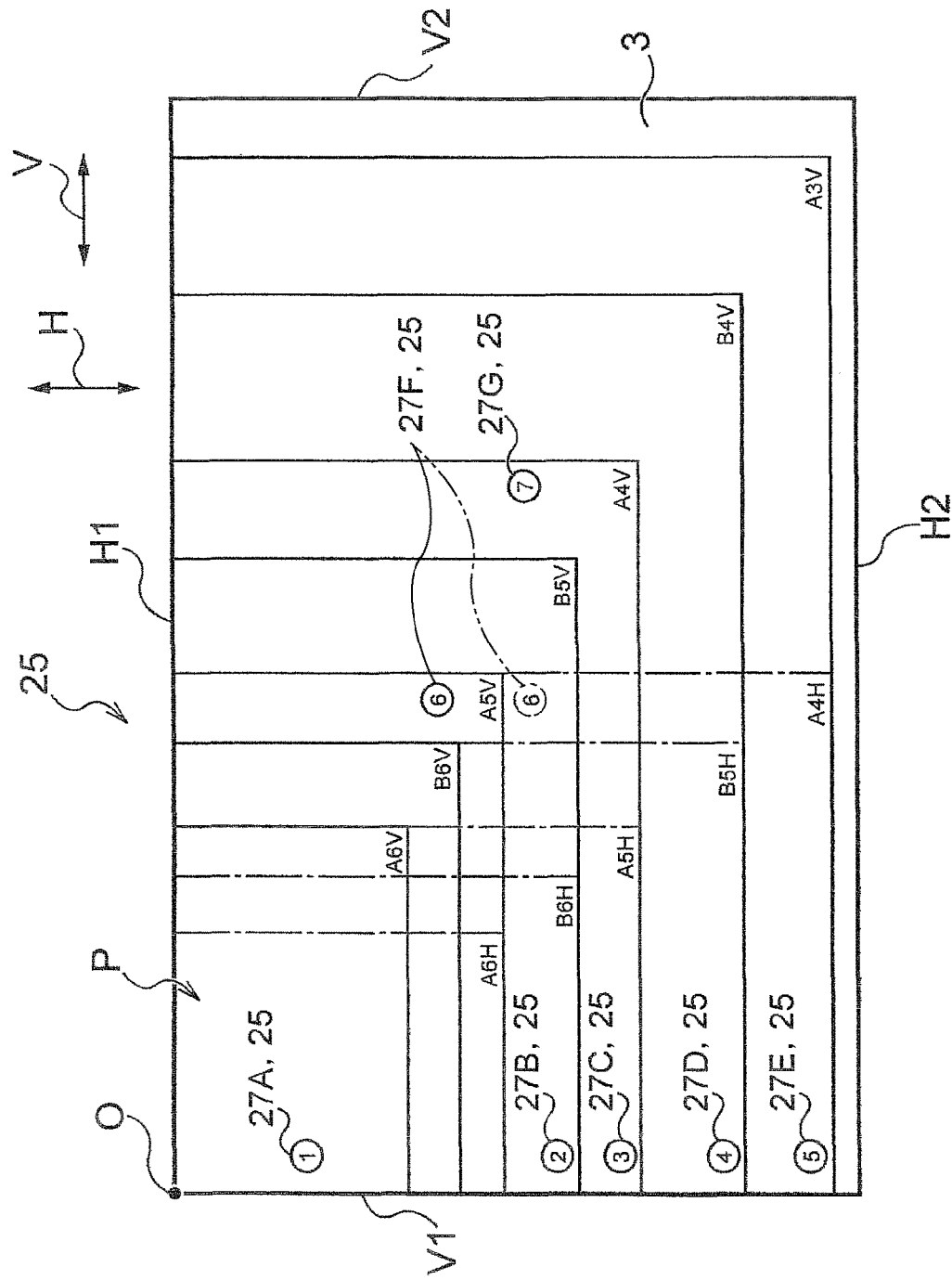
FIG. 19 is a planar view representing a positional relationship of the document size and the document size detection sensor of the image reading apparatus according to the embodiment of the disclosure.

(H) Positional Relationship of Document Size and Document Size Detection Sensor, Determination of Document Size Based on Presence or Absence Detection Result of Document by Each Document Size Detection Sensor (Refer to FIGS. 19 and 20)

In the embodiment, five document size detection sensors are disposed in order of 27A, 27B, 27C, 27D, and 27E close to the reference point O at a position along the reading start end V1 in the left and right direction V of the mounting surface 3. In addition, two document size detection sensors 27F and 27G are disposed at respectively different positions in the left and right direction V and the front/rear direction H separated in the left and right direction V from the five document size detection sensors 27A to 27E.

In addition, in the drawings, the document P indicated by A6V signifies the document P that is set at an A6 size portrait orientation, the document P indicated by A6H signifies the document P that is set at an A6 size portrait orientation, and the document P indicated by A6H signifies the document P that is set at an A6 size landscape orientation. In the same manner, the document P of each size of A5 to A3 and B6 to B4 set in the portrait orientation are assigned "V" at the end and set in landscape orientation are identified with "H" at the end.

Then, in the embodiment, conventionally, in FIG. 19, the position of the document size detection sensor 27F disposed at the position represented by an imaginary line is moved to a position indicated by a solid line, and thereby it is possible to identify the document P of A5V that it is conventionally possible to identify.

The size of the document P that it is possible to determine by the seven document size detection sensors 27A to 27G disposed in such a manner is as per the size determination table that is represented in FIG. 20. The documents P of A5 size, B5 size, and A4 size are able to be identified in both the portrait orientation and the landscape orientation, and documents P of B4 size and A3 size are able to be identified in the portrait orientation. In addition, there is a configuration such that it is also possible to identify the document P of the smaller size of B6 in the landscape orientation, and it is possible to identify the presence or absence of the document P of the portrait orientation of B6 size and the portrait orientation and the landscape orientation of A6 size.

Then, according to the image reading apparatus 1 according to the embodiment that is configured in such as manner, it is possible to improve detection precision of the presence or absence of the document P in the half-open state in which variation is great in the detection results in each related art scan or each apparatus by an inexpensive compact structure without using an expensive acceleration sensor, a transmission type optical sensor, or the like.

In addition, it is possible to make it difficult for environmental influence such as unclean air to have an effect by using the switch 11 that is a mechanical contact sensor as the sensor for half-open state detection. Furthermore, it is possible to reduce occurrence of defects due to insufficient pressing or excessive pressing of the switch 11 since the abutting surface 43 of the one end 17 of the rotary lever 15 horizontally slides in a process of the document cover 9 transitioning from the half-open state to the closed state by adopting the biasing member 19 and the support plate portion 45 that is provided with the rotary lever 15, the pressing portion 13, the cover side opening 35, and the document table side opening 55 with the configuration described above.

Other Embodiment

The image reading apparatus 1 as in the disclosure fundamentally has the configuration as described above, but of course it is also possible to modify or omit the partial configuration in a range that does not depart from the gist of the disclosure of the present application.

For example, it is possible to adopt the stated configuration in the embodiment in a typical processing device. In this case, the processing device is able to adopt a processing device basically provided with a main body portion that corresponds to the document table 5 of the image reading apparatus 1, an opening/closing cover that corresponds to the document cover 9 of the image reading apparatus 1, and in the same manner as the image reading apparatus 1, the pressing portion 13, the rotary lever 15, and the biasing member 19.

Then, according to the processing device that is configured in such a manner, when the opening/closing cover is at a predetermined angle θ by a process of displacement from the open state to the closed state, the one end 17 of the rotary lever 15 applies the external force F to the pressing portion 13 to push down the pressing portion 13 to change the state of the switch 11, and in the process of displacement from the predetermined angle θ to the closed state, the one end 17 of the rotary lever 15 rotates in a direction C approaching the opening/closing cover against the biasing force and pushes down the pressing portion 13 to maintain the state (for example, ON state) of the switch 11.

In addition, it is also possible to apply the image reading apparatus 1 of the disclosure to a multifunction printer in which a recording apparatus, a facsimile, a copying machine, and the like are combined without a special purpose machine that is commercialized as a single image reading apparatus 1. In addition, there may be a disposition such that the one end 17 of the rotary lever 15 faces toward the rotary shaft 7 side of the document cover 9 by reversing the orientation in which the rotary lever 15 is attached to the document cover 9.

Other than this, the angle θ of the document cover 9 when performing the detection process in the half-open state is able to be set to a further large angle θ in a case where it is possible to adopt various angles not limited to the angle θ stated in the description of the embodiment described above and desired detection precision is obtained even at a further large angle θ by combining mirrors and the like that change an optical path.

In addition, the document cover 9 may only function as a simple cover without an automatic document feeder (ADF).

What is claimed is:

1. An image reading apparatus comprising:
   a document table that has a mounting surface on which the document is mounted;
   a document cover that rotates around a rotary shaft to be displaced between a closed state in which the document table is covered and an open state in which the document table is open;
   a pressing portion that is disposed on the side of the document table and presses a switch by receiving external force;
   a rotary lever that is disposed on the side of the document cover and is provided to be pivotable at a position at which it is possible to apply external force to the pressing portion; and
   a biasing member that applies biasing force in a direction in which one end side of the rotary lever moves away from the document cover,
   wherein when the document cover is at a predetermined angle in a process of displacement from the open state to the closed state, the one end of the rotary lever applies the external force to the pressing portion to push down the pressing portion to change the state of the switch, and
   in the process of displacement from the predetermined angle to the closed state, the one end of the rotary lever rotates in a direction approaching the document cover against the biasing force and pushes down the pressing portion to maintain the state of the switch.

2. The image reading apparatus according to claim 1, wherein a cover side opening is provided on the document cover, and another end of the rotary lever is positioned within a cover side opening and the one end protrudes outside the cover side opening due to biasing force, and the rotary lever rotates with the other end side as a support point.

3. The image reading apparatus according to claim 2, wherein when the document cover is in the closed state, the rotary lever is accommodated in the cover side opening against the biasing force in a state where at least a part of the one end side is in contact with the pressing portion.

4. The image reading apparatus according to claim 1, wherein the switch is disposed below the front surface of the document table in a vertical direction, and
   a part of the pressing portion that contacts the rotary lever protrudes from a document table side opening formed on the document table to the document cover side.

5. The image reading apparatus according to claim 1, further comprising:
   a size detection mechanism that detects a size of a document that is mounted on the document table,
   wherein the size detection mechanism is operated by a change of the state of the switch, as a trigger, in the process of the document cover being displaced from the open state to the closed state.

6. A processing device comprising:
   a main body portion;
   an opening/closing cover that rotates around a rotary shaft to be displaced between a closed state in which a surface of the main body portion is covered and an open state in which the surface of the main body portion is open;

a pressing portion that is disposed on the side of the main body portion and presses a switch by receiving external force;

a rotary lever that is disposed on the side of the opening/closing cover and is provided to be pivotable at a position at which it is possible to apply external force to the pressing portion; and a biasing member that applies biasing force in a direction in which one end side of the rotary lever moves away from the opening/closing cover, wherein when the opening/closing cover is at a predetermined angle in a process of displacement from the open state to the closed state, the one end of the rotary lever applies the external force to the pressing portion to push down the pressing portion to change the state of the switch, and in the process of displacement from the predetermined angle to the closed state, the one end of the rotary lever rotates in a direction approaching the opening/closing cover against the biasing force and pushes down the pressing portion to maintain the state of the switch.

* * * * *